May 20, 1941.  A. HUELLE  2,242,860
LOADING DEVICE
Filed Aug. 29, 1940  4 Sheets-Sheet 1
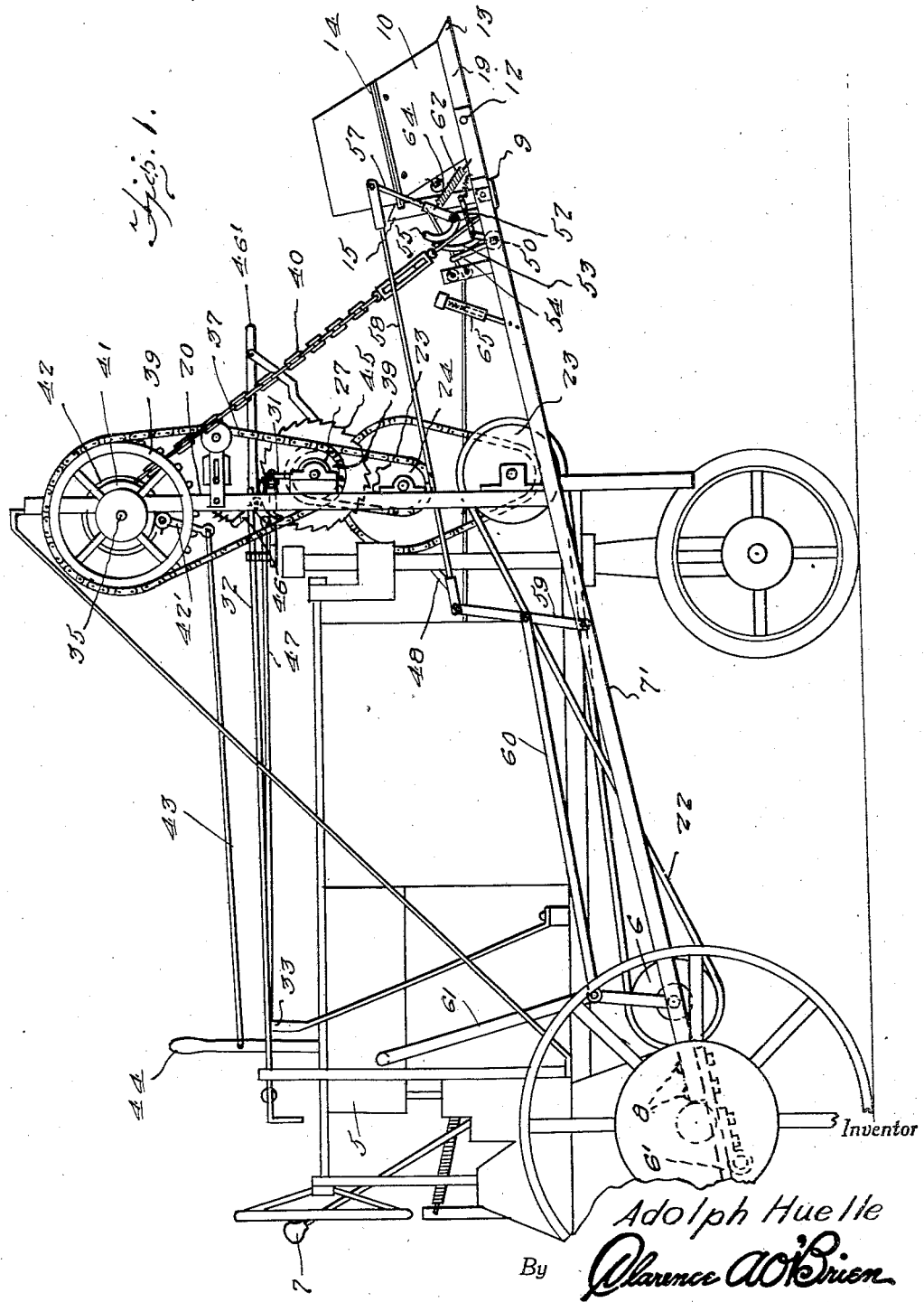
Inventor
Adolph Huelle
By Clarence A. O'Brien
Attorney

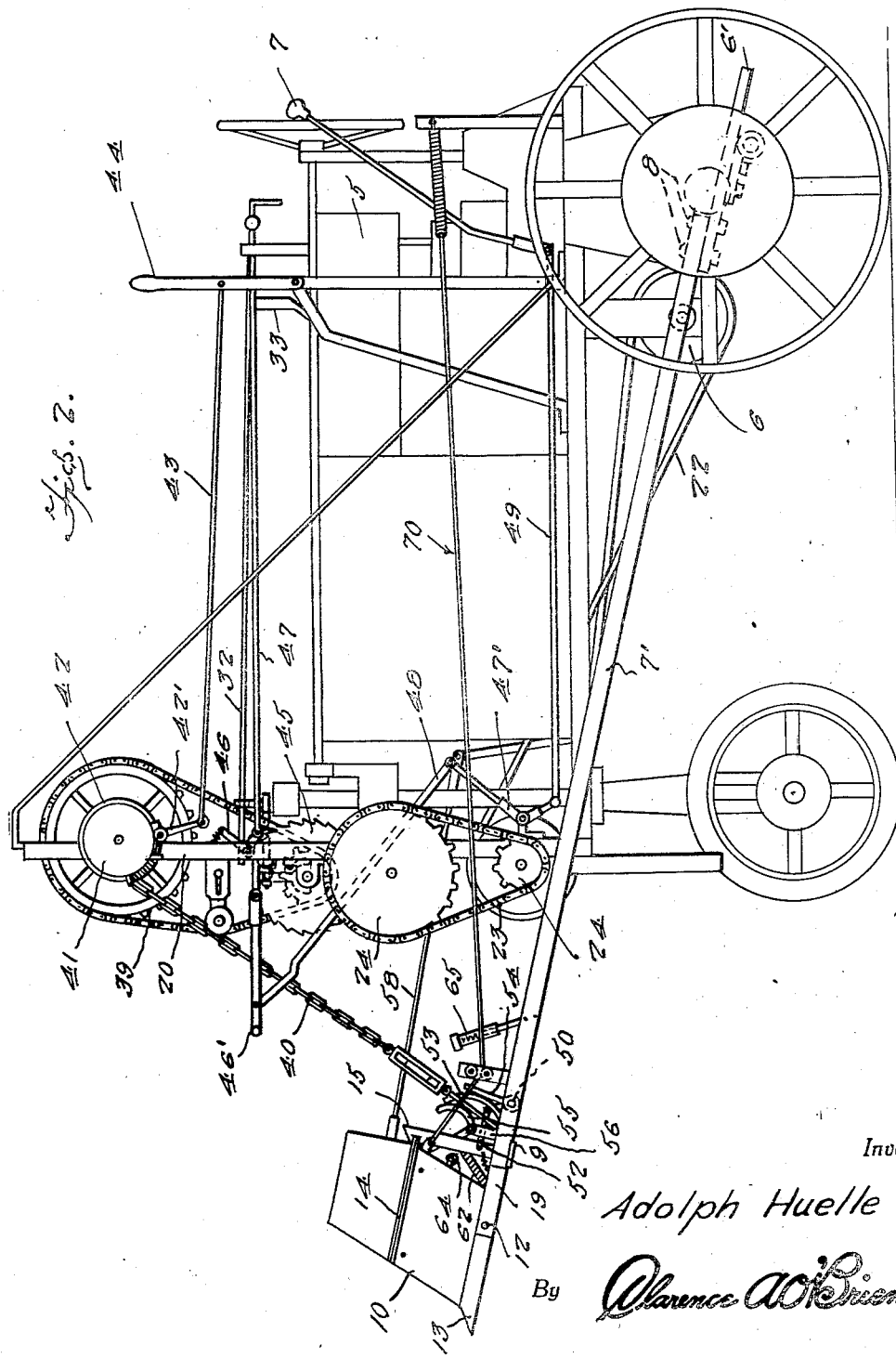

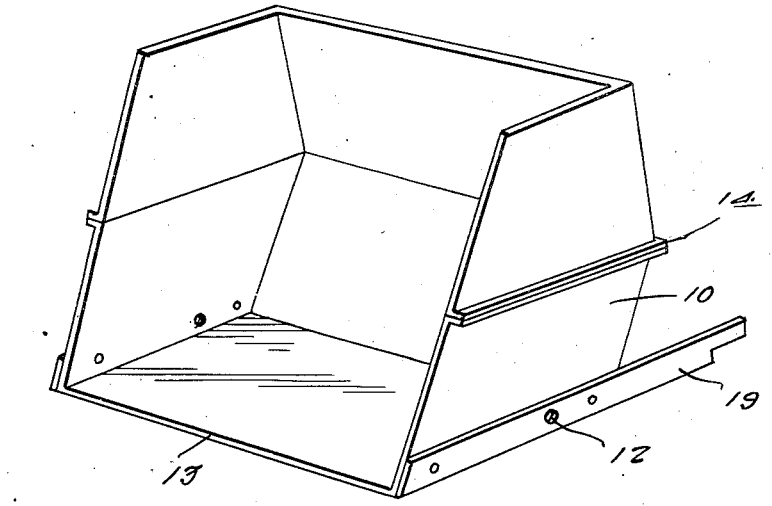
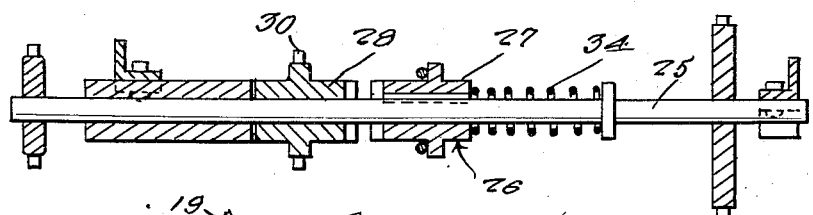
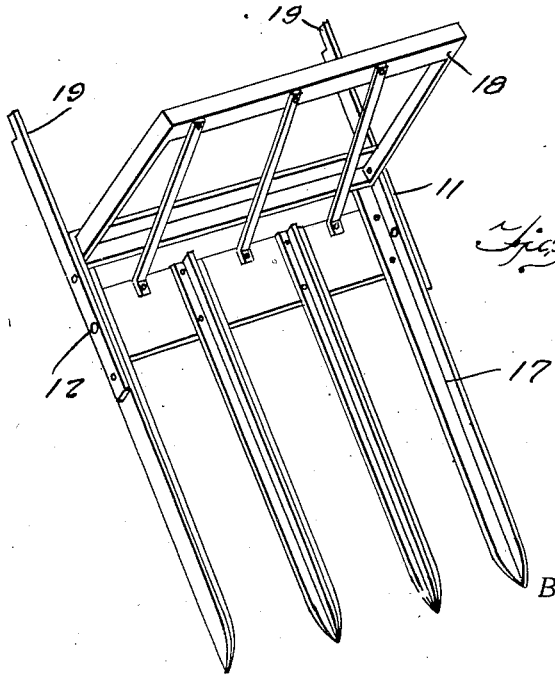
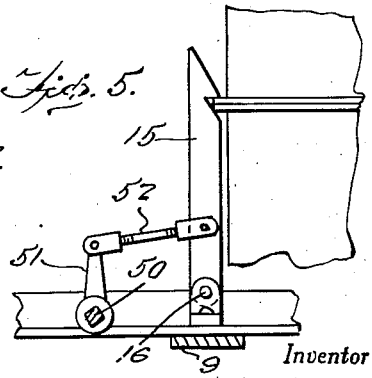

May 20, 1941.  A. HUELLE  2,242,860
LOADING DEVICE
Filed Aug. 29, 1940  4 Sheets-Sheet 3
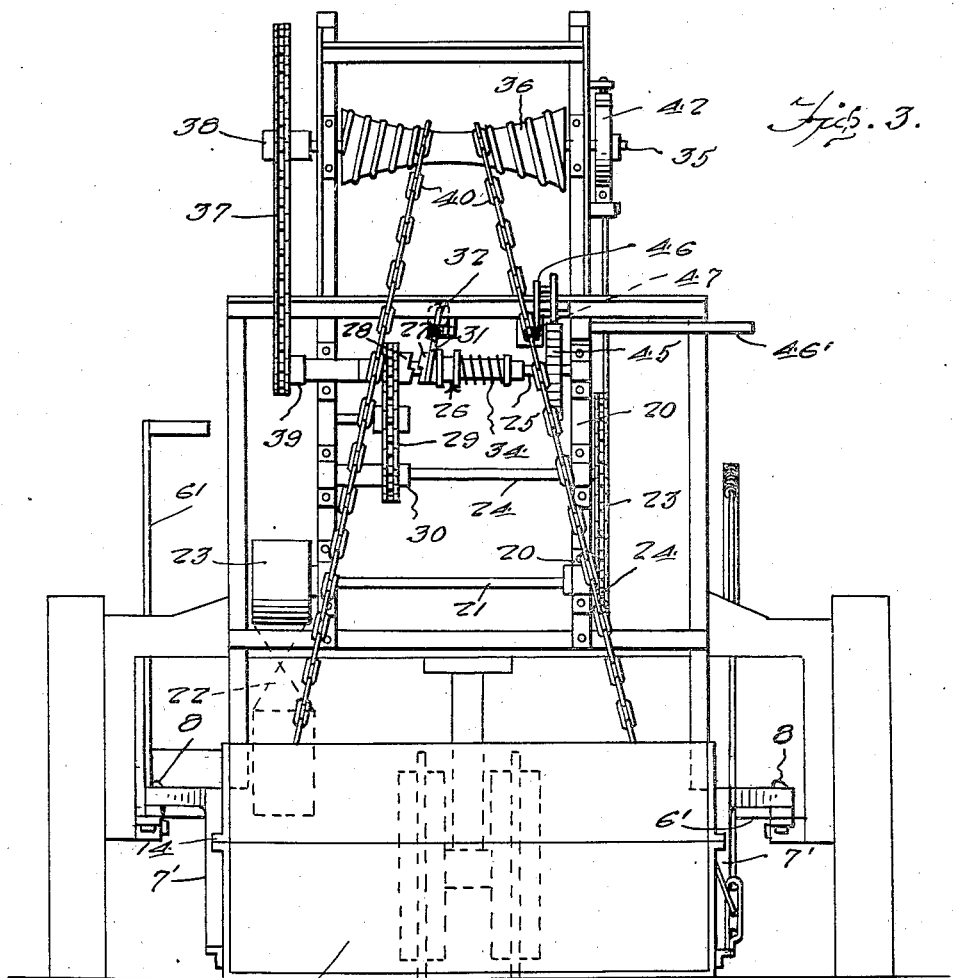
Fig. 3.
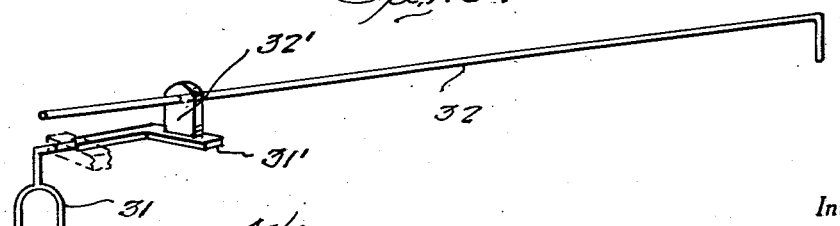
Fig. 8.
Fig. 9.
Inventor
Adolph Huelle
By Clarence A. O'Brien
Attorney Patented May 20, 1941

2,242,860

UNITED STATES PATENT OFFICE 2,242,860

LOADING DEVICE

Adolph Huelle, McClelland, Iowa

Application August 29, 1940, Serial No. 354,748

1 Claim. (Cl. 214—140)

This invention relates to a manure loading device in the form of an attachment especially adapted for installation on a conventional type of tractor, and has for the primary object the provision of a device of this character which will receive power from the tractor for its operation and will be extremely simple to control by the operator of the tractor and will permit materials of different kinds to be quickly gathered up and elevated to a selected height for unloading into a vehicle or for piling at some selected place remote from where said material is gathered.

With these and other objects in view as will become more apparent as the description proceeds, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a tractor equipped with a loading device constructed in accordance with my invention.

Figure 2 is a view similar to Figure 1 illustrating the opposite side of the tractor with the device applied thereto.

Figure 3 is a front elevation illustrating the device installed on the tractor.

Figure 4 is a fragmentary sectional view illustrating a driven shaft and a clutch mechanism therefor.

Figure 5 is a fragmentary side elevation, partly in section, illustrating a latch means for sustaining the load gathering device in operative or load-carrying position.

Figure 6 is a perspective view illustrating the scoop.

Figure 7 is a perspective view illustrating a loading fork.

Figure 8 is a perspective view illustrating a clutch control rod.

Figure 9 is a fragmentary side elevation partly in section, illustrating a support for control rods.

Referring in detail to the drawings, the numeral 5 indicates in entirety a conventional type of tractor frequently employed upon farms for agricultural purposes or for excavating or hauling loads. The tractor of the kind disclosed in the drawings includes a power takeoff mechanism in the form of a pulley 6 which may be clutched and declutched to the power source of the tractor through the operation of a control lever 7, and further includes a hinged draft bar 6'.

The foregoing description briefly sets forth a tractor to which the present invention may be readily installed so that the tractor can be used for gathering and loading material onto a vehicle or for piling the material at a selected place.

A pair of main arms 7' are arranged on opposite sides of the tractor and extend forwardly thereof for a considerable distance and have the rear ends detachably secured on the draft bar 6', as shown at 8. The main arms 7' adjacent the forward ends thereof are connected by a transverse member 9 and pivotally mounted to the forward ends of said arms is either a scoop 10 or a gathering fork 11. The pivotal connection between the scoop or fork and the arms is indicated by the character 12.

The scoop 10 is preferably in the form of a bucket having a sharpened edge 13 so as to readily loosen or dig into materials for gathering them in the scoop. The scoop is further provided, between its upper and lower edges, with an external flange 14 which may be engaged by a latch 15 pivotally mounted, as shown at 16. The latch releasably retains the scoop in load-carrying position.

The fork 11 includes a series of tines 17 with a rear upstanding frame 18 of skeleton formation. Guide members 19 are secured on the fork 11 and also on the scoop 10. The side members are for the purpose of engaging the cross member 9 of the main arms 7' to prevent the fork or the scoop from tilting rearwardly on the pivot. It is to be understood that when the fork 11 is employed the latch 15 may engage with the frame 18 for sustaining the fork in operative position.

A vertical frame 20 is mounted on the forward end of the tractor and has journaled thereon a power shaft 21 connected to the pulley 6 by an endless belt 22. A pulley 23 is secured to the power shaft 21 over which the belt 22 is trained. A jack shaft 24 is journaled on the frame 20 directly above the shaft 21 and a sprocket chain 23 trained over sprocket gears 24 transmits power from the shaft 21 to the shaft 24, it being understood that the sprocket gears are secured on the respective shafts.

The clutch shaft 25 is journaled on the frame 20 above the shaft 24 and connected therewith is a clutch 26, including clutch elements 27 and 28. The clutch element 27 is splined on the clutch shaft 25, while the clutch element 28 is journaled thereon. The clutch element 28 is connected to the jack shaft 24 by a sprocket chain 29 and sprocket gears 30, it being understood that one of the sprocket gears is secured on the shaft 24 while the other sprocket gear forms an integral part of the clutch element 28.

A clutch fork 31 engages with the clutch element 27 and is journaled on the frame 20 and is provided with a cam arm 31'. An operating rod 32 is journaled on the frame 20 and extends rearwardly over the tractor and is supported by a rack 33 mounted on the rear portion of the tractor. A cam 32' is secured on the rod 32 and engages the cam arm 31'. The operating rod 32 is in convenient reach of the driver of the tractor and may be rotated in the proper direction for disengaging the clutch element 27 from the clutch element 28. A spring 34 acts on the clutch element 27 to normally engage the same with the clutch element 28 so that when it is desired to disengage the clutch the operator must rotate and hold the operating rod 32 to retain the clutch disengaged.

Journaled on the frame 20 above the clutch shaft 25 is a drum shaft 35 on which is secured a drum 36. The drum shaft 35 is connected to the clutch shaft 25 by a sprocket chain 37 trained over sprocket gears 38 and 39. The sprocket gear 39 is secured on the clutch shaft 25 while the sprocket gear 38 is secured on the drum shaft 35.

Flexible elements 40 are secured to and wound on the drum 36 and are connected to the main arms 7' adjacent the forward ends thereof.

A brake drum 41 is secured on the drum shaft and coacting therewith is a brake band 42 adapted to be contracted into engagement with the drum by pivotal movement of an operating arm 42'. The arm 42' is pivotally connected to a connecting rod 43 which is in turn pivoted to a control lever 44 mounted on the tractor in convenient reach of the driver or operator.

A ratchet gear 45 is secured on the clutch shaft 25 and coacting therewith is a pivoted dog 46 adapted to ratchet over the ratchet gear in one direction and to engage and lock therewith on rotation of the ratchet gear in a reverse direction. The dog 46 is operated or disengaged from the ratchet gear by an operating rod 47 extending rearwardly over the tractor and supported by the rack 33 so as to be in convenient reach of the driver or operator of the tractor whenever it is desired to disengage the dog from the ratchet gear.

A trip arm 46' is pivotally mounted on the frame 20 within the path of the upward movement of the main arms 7' and is connected to a bell crank lever 47' by a connecting link 48. The bell crank lever is pivotally mounted on the frame 20 and is connected to the power takeoff control lever 7 of the tractor by a connecting link 49. The trip arm 46' is so located that when the loading fork or scoop carried by the arms 7' reaches its uppermost position the trip arm 7' will be rocked on its pivot to actuate the control lever 7 and bring about interruption of the power from the tractor to the drive shaft 21 and consequently automatically stop the elevation of the scoop or fork.

A shaft 50 is journaled on the main arms 7' just rearwardly of the scoop or fork and has secured thereto an arm 51 which is in turn connected to the latch 15 by a connecting link 52. An arcuately curved cam 53 is secured to an arm 54 fastened on the shaft 50. An arcuately curved cam 55 is pivotally mounted on a support 56 carried by the cross member 9 of the arms 7' to coact with the cam element 53 in imparting rotation to the shaft 50 for the purpose of disengaging the dog from the scoop or fork. An arm 57 is formed on the pivoted end of the cam 55 and a connecting link 58 is pivoted thereto. A lever 59 is pivoted on one of the arms 7' and has the connecting lever 58 pivoted thereto. A connecting link 60 is pivoted to the lever 59 and to a control lever 61 pivotally mounted on the tractor 5. A coil spring 62 is connected to the arm 57 and to one of the arms 7'. A cam roller 64 is located on the scoop or fork. To release the scoop or fork for gravitation into an unloading position, a pull is made on the control lever 61 which causes the cam 55 to engage the cam 53 and thereby release the latch 15 from the fork or scoop. During the pull on the control lever 61 the cam 55 passes the cam 53 and strikes the roller 64 to urge the scoop or fork into dumping position, it being understood that the latch previously has been disengaged.

A spring bumper 65 is carried by one of the arms 7' in the path of movement of the connecting link 58 and is adapted to be engaged thereby when the control lever 61 has been moved into a position of releasing the catch from the scoop or fork and for engaging the cam 55 with the cam roller 64 so that on the control lever 61 being returned to its original position, the spring bumper 65 will act to move the cam 55 beyond dead center position and thereby return to its initial position past the cam 53 so that the latch may return to latching position.

A yieldable connection 70 is arranged between the tractor 5 and the scoop or fork and which will permit the scoop or fork to assume dumping position when the arms 7' are elevated. However, when the arms move to a substantially lowered position, the yieldable connection 70 will act to swing the scoop or fork into load-carrying position so as to be engaged by the latch 15.

In operation, with the arms 7' in their lowermost position, the scoop or fork is then riding upon the ground so that a forward motion of the tractor will load material therein. To elevate the scoop or fork into load-carrying position, the operator clutches the power takeoff pulley 6 into gear with the power source of the tractor through the operation of the hand lever 7. The power shaft 21 is then rotated by power from the power source of the tractor. The operator engages the clutch 26 so that the drum 36 will be rotated for winding thereon the flexible element 40 and thereby bring about the elevation of the scoop or fork to load-carrying position. As the scoop or fork nears load-carrying position, it engages the trip arm 46' and imparts pivotal movement thereto so as to actuate the hand control lever 7 and bring about declutching of the power takeoff pulley from the power source of the tractor. The dog 46 engaging the ratchet gear 45 retains the scoop or fork in load-carrying position.

When it is desired to dump the load from the scoop or fork, the operator pulls upon the control lever 61. To lower the scoop or fork into engagement with the ground after unloading, the operator first declutches the clutch and applies the brake, then releases the ratchet dog from the ratchet gear 45. The brake is then slowly released to permit the scoop to gradually gravitate to the ground. As the scoop or fork comes in contact with the ground during the downward movement of the arms 7' it is caused to pivot and assume load gathering position with the latch 15 in engagement therewith.

While I have shown and described the preferred embodiment of my invention, it will be understood that minor changes in construction, combination and arrangement of parts may be made without departing from the spirit and scope of the invention as claimed.

Having thus described my invention, what I claim is:

In a loading device, pivoted arms mounted on a tractor, a connecting member joining said arms, means for pivoting said arms by power derived from the tractor, a material gathering means pivoted on said arms to assume load-carrying and load-dumping positions, a pivoted latch for releasably securing said material gathering means in load-carrying position, a latch operating shaft journaled on said arms, means for connecting said latch to said shaft, a cam secured to said shaft, a pivoted cam for coaction with the first cam to actuate the latch and to move the material carrying means toward dumping position after the release of the latch therefrom and the disengagement of the second cam from the first cam, an operating means for the second cam, and a spring restoring means coactive with said operating means to assist the latter in restoring the second cam to its initial position of engaging said first cam.

ADOLPH HUELLE.